(12) United States Patent
Dickenson et al.

(10) Patent No.: US 10,392,882 B2
(45) Date of Patent: Aug. 27, 2019

(54) FLOW MONITORING USING DISTRIBUTED STRAIN MEASUREMENT

(71) Applicant: Schlumberger Technology Corporation, Sugar Land, TX (US)

(72) Inventors: Paul Dickenson, Southampton (GB); Gareth Lees, Southampton (GB); Colin Allan Wilson, Sugar Land, TX (US); Surya Perdana Simanjuntak, Southampton (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 187 days.

(21) Appl. No.: 15/127,279

(22) PCT Filed: Mar. 17, 2015

(86) PCT No.: PCT/US2015/020899
§ 371 (c)(1),
(2) Date: Sep. 19, 2016

(87) PCT Pub. No.: WO2015/142803
PCT Pub. Date: Sep. 24, 2015

(65) Prior Publication Data
US 2017/0175465 A1    Jun. 22, 2017

Related U.S. Application Data

(60) Provisional application No. 61/954,952, filed on Mar. 18, 2014.

(51) Int. Cl.
*E21B 21/08*    (2006.01)
*E21B 43/12*    (2006.01)
(Continued)

(52) U.S. Cl.
CPC .............. *E21B 21/08* (2013.01); *E21B 43/12* (2013.01); *E21B 47/102* (2013.01);
(Continued)

(58) Field of Classification Search
CPC .... E21B 2049/085; E21B 21/08; E21B 43/12; E21B 47/102; E21B 47/123; G01F 1/661
See application file for complete search history.

(56) References Cited

U.S. PATENT DOCUMENTS 5,845,033 A * 12/1998 Berthold ............. E21B 47/0006
385/12
6,009,216 A * 12/1999 Pruett ................... E21B 17/206
219/502

(Continued)

FOREIGN PATENT DOCUMENTS

WO    WO2005106396 A2    11/2005
WO    WO2013159237 A1    10/2013

OTHER PUBLICATIONS

Hotate, K. et al., "Distributed fiber Brillouin strain sensing with 1-cm spatial resolution by correlation-based continuous-wave technique", IEEE Photonics Technology Letters, 2002. 14(2), pp. 179-181.

(Continued)

*Primary Examiner* — John Fitzgerald

(57) ABSTRACT

A technique facilitates monitoring of flow conditions with respect to flow through a tubing. A distributed sensor is routed along an interior of the tubing to monitor flow conditions. For example, the distributed sensor may be routed over a length of the tubing having a lateral opening. Fluid is flowed along the distributed sensor and within the interior of the tubing. The distributed sensor is operated to measure strain which results from flow of the fluid along the distributed sensor. The strain may then be evaluated to (Continued)

determine a change in a flow condition, such as a change in a flow condition related to the lateral opening.

13 Claims, 4 Drawing Sheets

(51) Int. Cl.
*E21B 47/10* (2012.01)
*E21B 47/12* (2012.01)
E21B 49/08 (2006.01)
G01F 1/66 (2006.01)

(52) U.S. Cl.
CPC ...... *E21B 47/123* (2013.01); *E21B 2049/085* (2013.01); *G01F 1/661* (2013.01)

(56) References Cited

U.S. PATENT DOCUMENTS

| | | | | |
|---|---|---|---|---|
| 6,271,766 B1* | 8/2001 | Didden | ............. | G01D 5/35383 340/853.1 |
| 6,545,760 B1 | 4/2003 | Froggatt et al. | | |
| 6,555,807 B2* | 4/2003 | Clayton | ............. | E21B 47/0006 250/227.14 |
| 6,913,079 B2* | 7/2005 | Tubel | ............. | E21B 47/00 114/382 |
| 7,182,134 B2* | 2/2007 | Wetzel | ............. | A45C 13/02 166/250.01 |
| 7,245,791 B2* | 7/2007 | Rambow | ............. | E21B 47/0006 385/12 |
| 7,283,216 B1* | 10/2007 | Geng | ............. | G01B 11/18 356/35.5 |
| 7,355,163 B2* | 4/2008 | Watley | ............. | E21B 47/102 250/227.14 |
| 7,397,976 B2* | 7/2008 | Mendez | ............. | E21B 47/06 385/12 |
| 7,409,858 B2* | 8/2008 | Dria | ............. | E21B 17/206 73/152.33 |
| 7,617,873 B2* | 11/2009 | Lovell | ............. | E21B 47/123 166/250.01 |
| 8,234,931 B2 | 8/2012 | Cheng et al. | | |
| 8,245,780 B2* | 8/2012 | Fidan | ............. | E21B 47/102 166/250.03 |
| 8,930,143 B2* | 1/2015 | Sierra | ............. | E21B 47/065 702/6 |
| 9,074,592 B2* | 7/2015 | Morrison | ............. | E21B 17/20 |
| 9,109,968 B2* | 8/2015 | Dutoit | ............. | E21B 47/0001 |
| 9,228,889 B2* | 1/2016 | McCann | ............. | G01H 9/004 |
| 2003/0094281 A1* | 5/2003 | Tubel | ............. | E21B 47/00 166/250.03 |
| 2003/0205083 A1* | 11/2003 | Tubel | ............. | E21B 23/03 73/152.19 |
| 2005/0039927 A1* | 2/2005 | Wetzel | ............. | A45C 13/02 166/384 |
| 2005/0263281 A1* | 12/2005 | Lovell | ............. | E21B 17/206 166/255.1 |
| 2006/0165344 A1* | 7/2006 | Mendez | ............. | E21B 47/06 385/13 |
| 2007/0171402 A1* | 7/2007 | Watley | ............. | E21B 47/102 356/73.1 |
| 2008/0142212 A1* | 6/2008 | Hartog | ............. | E21B 17/025 166/250.01 |
| 2009/0114386 A1* | 5/2009 | Hartog | ............. | E21B 43/26 166/250.08 |
| 2009/0188665 A1* | 7/2009 | Tubel | ............. | E21B 23/03 166/250.01 |
| 2009/0266533 A1* | 10/2009 | Baajiens | ............. | E21B 33/1208 166/66 |
| 2010/0018703 A1* | 1/2010 | Lovell | ............. | E21B 17/206 166/255.2 |
| 2010/0085572 A1* | 4/2010 | Hartog | ............. | G01D 5/35383 356/478 |
| 2010/0139909 A1* | 6/2010 | Tirado | ............. | E21B 34/10 166/51 |
| 2010/0219334 A1* | 9/2010 | Legrand | ............. | E21B 47/10 250/256 |
| 2010/0254650 A1* | 10/2010 | Rambow | ............. | G01D 5/35383 385/13 |
| 2011/0088462 A1* | 4/2011 | Samson | ............. | E21B 47/10 73/152.18 |
| 2011/0185815 A1* | 8/2011 | McCann | ............. | G01H 9/004 73/655 |
| 2011/0280103 A1* | 11/2011 | Bostick, III | ............. | E21B 47/101 367/35 |
| 2012/0013893 A1* | 1/2012 | Maida | ............. | E21B 47/123 356/73.1 |
| 2012/0014211 A1* | 1/2012 | Maida, Jr. | ............. | E21B 47/09 367/13 |
| 2012/0111560 A1* | 5/2012 | Hill | ............. | E21B 43/11857 166/250.1 |
| 2013/0091942 A1* | 4/2013 | Samson | ............. | E21B 47/10 73/152.18 |
| 2013/0233537 A1* | 9/2013 | McEwen-King | ............. | E21B 43/26 166/250.1 |
| 2015/0048243 A1* | 2/2015 | Childers | ............. | B29C 71/00 250/269.1 |
| 2015/0075783 A1* | 3/2015 | Angman | ............. | E21B 43/26 166/250.01 |
| 2015/0128692 A1* | 5/2015 | Chen | ............. | E21B 47/1005 73/152.18 |
| 2015/0146759 A1* | 5/2015 | Johnston | ............. | E21B 47/065 374/117 |
| 2016/0222763 A1* | 8/2016 | DeWitt | ............. | E21B 7/14 |
| 2016/0265345 A1* | 9/2016 | In 'T Panhuis | ............. | E21B 47/123 |
| 2016/0327436 A1* | 11/2016 | Tur | ............. | G01K 11/32 |
| 2017/0268320 A1* | 9/2017 | Angman | ............. | E21B 43/26 |

OTHER PUBLICATIONS

Hotate, K. et al., "Distributed Discrimination of Strain and Temperature Based on Brillouin Dynamic Grating in an Optical Fiber", Photonic Sensors, 2013, 3(4): pp. 332-344.
Search Report and Written Opinion of International Patent Application No. PCT/US2015/020899, dated Jul. 13, 2015, 13 pages.
International Preliminary Report on Patentability of International Patent Application No. PCT/US2015/020899, dated Sep. 29, 2016, 9 pages.

\* cited by examiner

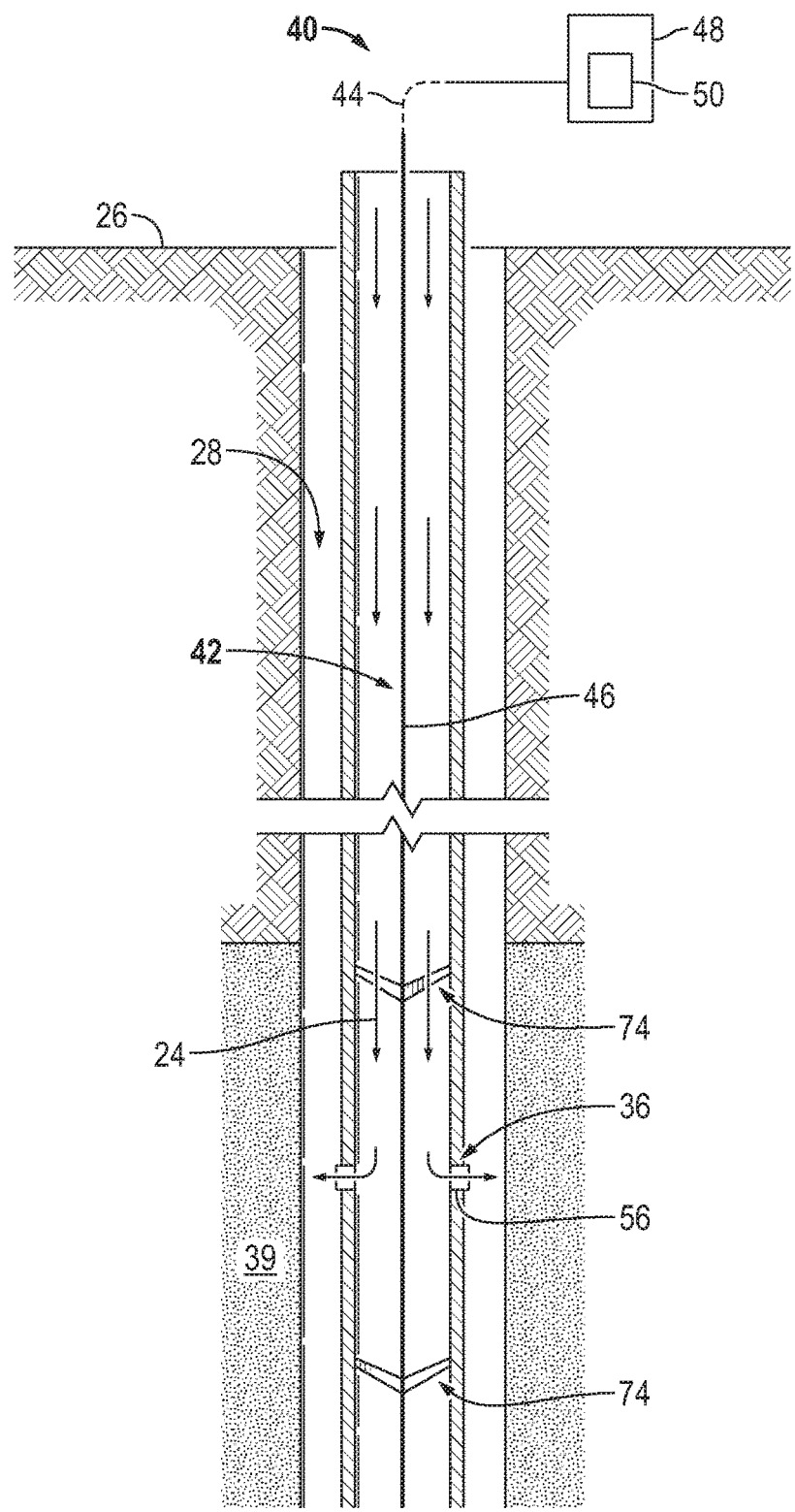

FLOW MONITORING USING DISTRIBUTED STRAIN MEASUREMENT

CROSS-REFERENCE TO RELATED APPLICATIONS

The present document is based on and claims priority to U.S. Provisional Application Ser. No. 61/954,952, filed Mar. 18, 2014, which is incorporated herein by reference in its entirety.

BACKGROUND

Hydrocarbon fluids such as oil and natural gas are obtained from a subterranean geologic formation, referred to as a reservoir, by drilling a well that penetrates the hydrocarbon-bearing formation. Once a wellbore is drilled, various forms of well completion components may be installed to control and enhance the efficiency of producing the various fluids from the reservoir. The well completion components may comprise a variety of sensors and other equipment for monitoring parameters related to the environment and/or production of well fluid.

SUMMARY

In general, a methodology and system are provided to facilitate monitoring of flow conditions with respect to fluid flow through a tubing. A distributed sensor is routed along an interior of the tubing to monitor flow conditions. For example, the distributed sensor may be routed over a length of the tubing having a lateral opening. Fluid is flowed along the distributed sensor and within the interior of the tubing. The distributed sensor is operated to measure strain which results from the flow of fluid along the distributed sensor. The strain may then be evaluated to determine a flow condition, such as a flow condition related to the lateral opening.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 4 is an illustration of another example of a tubing system having a distributed sensor deployed along an interior of the tubing, according to an embodiment of the disclosure.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The present disclosure generally relates to a methodology and system to facilitate monitoring of flow conditions with respect to fluid flow through a tubing. By way of example, the tubing may comprise a wellbore casing or a tubing string, e.g. a downhole completion, deployed within the wellbore. A distributed sensor is routed along an interior of the tubing to monitor flow conditions. The distributed sensor may comprise an optical fiber or a plurality of optical fibers. In various applications, the optical fiber or fibers is part of an optical fiber cable routed along the interior of the tubing.

In some embodiments, the tubing has at least one lateral opening and the distributed sensor is routed along a length of the tubing which includes the lateral opening. Fluid is flowed along the distributed sensor and within the interior of the tubing. The distributed sensor is operated to measure strain which results from the flow of fluid along the distributed sensor. The strain may then be evaluated to determine a flow condition, such as a change in flow velocity related to the lateral opening. For example, the strain may be evaluated to determine an outflow and/or inflow of fluid. In some applications, however, the strain may be evaluated to measure flow rates along a length of the tubing.

According to an embodiment, fluid flow is monitored with respect to flow into and/or out of a wellbore. In some applications, the distributed sensor may be used to identify regions of a reservoir accepting injected fluids or emitting production fluids. The distributed sensor, e.g fiber optic cable, may be run downhole into the well and interrogated from the surface so as to determine the flow rate/velocity of fluid flowing along the fiber optic cable past specific sections of the fiber optic cable or along the entire fiber optic cable.

Figure 1:
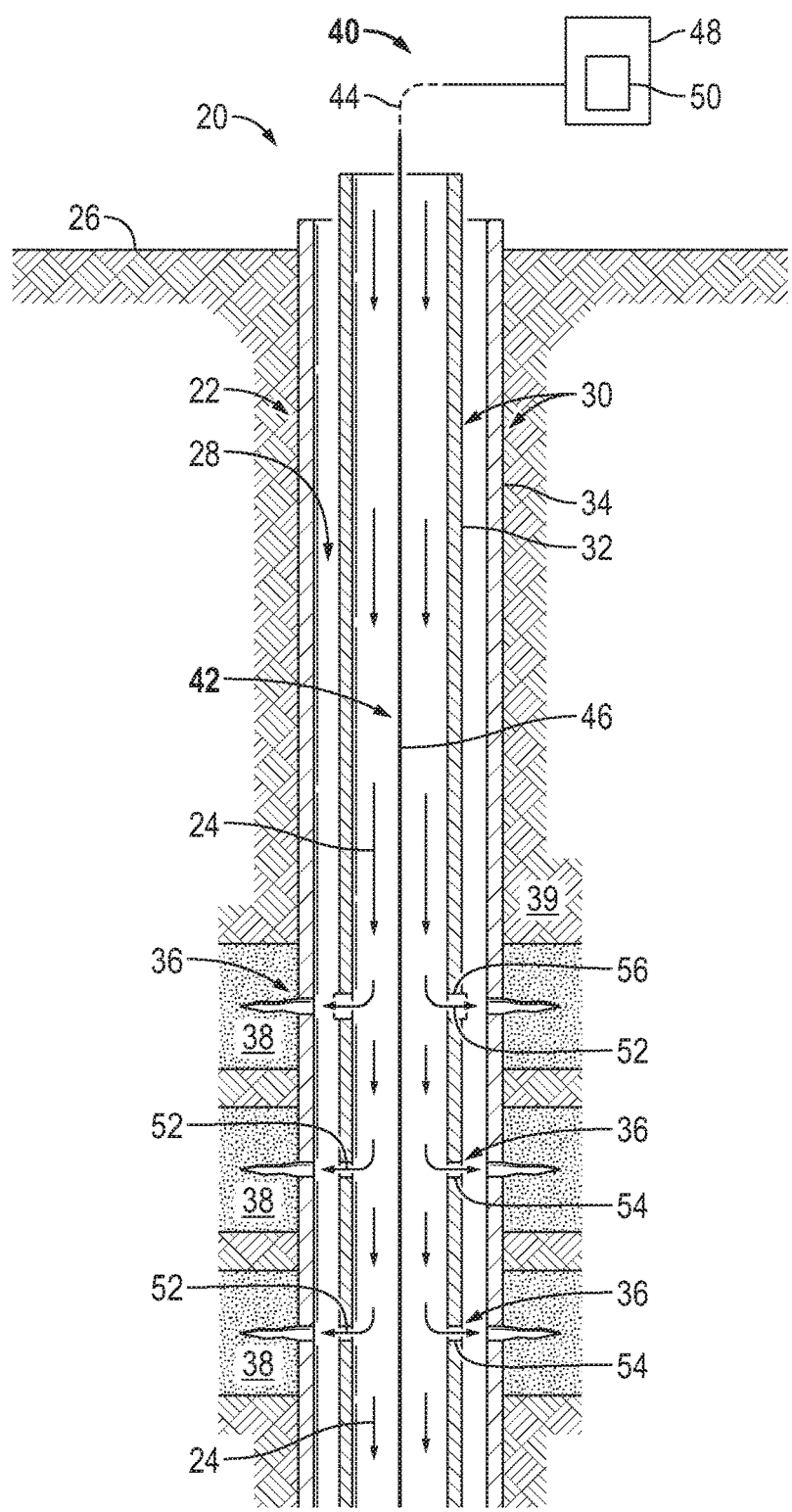
FIG. 1 is a schematic illustration of a well system comprising a tubing deployed in a wellbore and a distributed sensor deployed along an interior of the tubing, according to an embodiment of the disclosure.

Referring generally to FIG. 1, an example of a well system 20 used for monitoring a flow condition in a well 22 is illustrated. In this example, a fluid 24, e.g. an injection fluid, is injected from a surface location 26 and is flowed down into a wellbore 28. For example, the fluid may be a liquid flowed down through a tubing 30, e.g. an internal tubing string 32 and/or a casing string 34, before exiting through a lateral opening 36 in the tubing 30. In the illustrated example, the fluid 24 exits through a plurality of lateral openings 36 and enters into corresponding reservoir zones 38 of a surrounding formation 39. Depending on the application, the tubing 30 may be deployed downhole in the form of a production tubing string and/or injection tubing string.

In the embodiment illustrated, a flow monitoring system 40 comprises a distributed sensor 42 routed along an interior of the tubing 30. The distributed sensor 42 is operated to determine a flow condition of the fluid 24, e.g. a change in fluid flow velocity. By way of example, the distributed sensor 42 may comprise at least one optical fiber 44, such as an optical fiber disposed in an optical fiber cable 46. As the fluid 24 flows along the optical fiber cable 46 and optical fiber 44, the optical fiber 44 experiences strain and this strain changes according to the flow condition, e.g. according to the fluid flow rate/velocity. For example, the strain is reduced as flow velocity decreases along the optical fiber cable 46 when the flow of fluid 24 exits tubing 30 through lateral openings 36 and enters into the surrounding reservoir zones 38.

When the distributed sensor 42 comprises optical fiber 44, the optical fiber may be coupled with a laser interrogation system 48 of monitoring system 40. In some embodiments, distributed measurements, e.g. distribute strain measurements, may be made by interrogating the optical fiber 44 using laser pulses generated by laser interrogation system 48. An example of such an interrogation method comprises a distributed strain measurement method in which the laser interrogation system 48 fires a laser pulse into the optical fiber 44 from one end and monitors the Brillouin backscatter from the optical fiber 44. The frequency of this backscatter from each section of the optical fiber 44 depends on, for example, both temperature and strain experienced by that section of the optical fiber 44. The laser interrogation system 48 may comprise or work in cooperation with a data processor 50, e.g. a microprocessor, which analyzes the strain experienced by the optical fiber 44. An example of a laser interrogation system 48 is a distributed strain and temperature sensor (DSTS) system, such as DSTS systems available from Schlumberger Corporation.

Depending on the parameters of a given application, the laser interrogation system 48 working in cooperation with optical fiber 44 of optical fiber cable 46 may be used to monitor strain along specific lengths of the optical fiber 44 or along the entire optical fiber 44. The data obtained from optical fiber 44 regarding strain can be processed via data processor 50 to determine, for example, flow velocity along a given section of the optical fiber cable 46. Additionally, the strain data may be used to determine regions along the optical fiber cable 46 in which fluid flow is leaving or entering the tubing 30, e.g. leaving or entering the wellbore 28. In the embodiment illustrated in FIG. 1, for example, fluid 24 is illustrated via arrows 52 as leaving tubing 30 and wellbore 28 and moving into the surrounding reservoir zones 38.

In some embodiments, the flow of fluid 24 along optical fiber cable 46 may create strain by at least two mechanisms. A first mechanism involves the drag along optical fiber cable 46 which results from the flow of fluid 24 along cable 46. The drag places the optical fiber cable 46 under tension, and the tension at selected points along the cable 46 (or along the entire cable 46) may be determined. For example, the tension can be determined by the total drag on a section of the cable 46 between a location of interest and the next point at which the optical fiber cable 46 is anchored on a downstream side of the location of interest. Assuming the properties of cable 46 are constant along its length, there is a direct relationship between tension and strain. Consequently, a measurement of strain provides a measurement of the drag experienced by the optical fiber cable 46 at the location of interest. For example, the higher the flow velocity of fluid 24 along cable 46, the greater the drag experienced by the cable 46. A relationship between the drag and the fluid flow velocity exists such that levels of drag may be mapped to corresponding velocities/rates of fluid flow. Hence, a measurement of strain on cable 46 at a given location can be converted to a measurement of flow velocity of fluid 24 at the given location.

A second mechanism involves measuring strain on optical fiber cable 46 due to flow of fluid 24 as it leaves or enters tubing 30 through lateral openings 36. In well applications, the optical fiber cable 46 may be used to measure strain as fluid 24 flows out of or into wellbore 28 through, for example, casing 34. When, for example, the flow of fluid 24 moves radially out of tubing 30 and/or out of wellbore 28, the flow pattern causes the optical fiber cable 46 to move towards the fluid flow exit. This force causing the optical fiber cable 46 to move towards the fluid flow exit establishes tension in the optical fiber 44 near the lateral opening 36 and compression in the optical fiber 44 immediately downstream. The tension and subsequent compression in optical fiber 44 also occurs at locations where fluid 24 flows into the tubing 30, e.g. into wellbore 28. For example, this type of optical fiber deformation can be measured at openings through which production well fluid flows into the wellbore 28 and/or into production tubing 30.

Depending on the application, the lateral opening or openings 36 may be constructed in a variety of forms. Examples of openings 36 comprise perforations 54. In some applications, valves 56 may be combined with corresponding lateral openings 36. If valve 56 is positioned to control flow through a corresponding lateral opening 36, then a change in a flow condition, e.g. a change in flow rate, (as indicated by a change in strain along optical fiber 44) may be used to determine when the valve 56 is actuated in an opening or closing direction.

Figure 2:
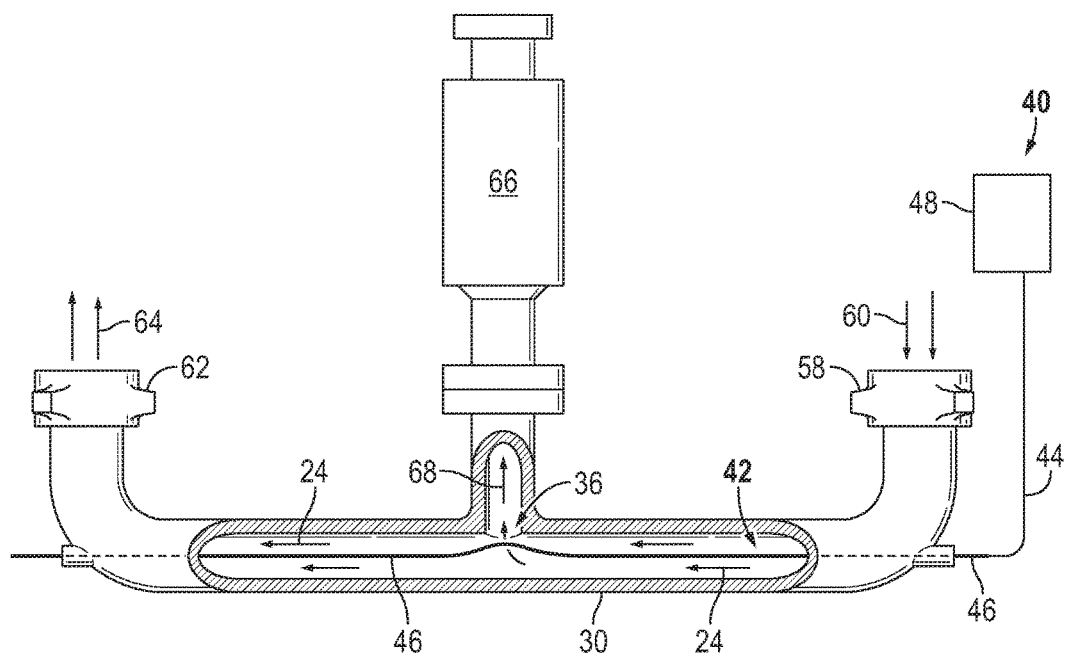
FIG. 2 is an illustration of another example of a tubing system having a distributed sensor deployed along an interior of the tubing, according to an embodiment of the disclosure.

Referring generally to FIG. 2, another example of tubing 30 is illustrated in which optical fiber cable 46 extends along an interior of the tubing 30. Tubing 30 may be in the form of a pipe, e.g. a downhole pipe or a surface pipe. In this example, liquid enters the tubing 30 through an inlet feature 58 as indicated by arrows 60 and flows along the interior of tubing 30 and along optical fiber cable 46. Some of the fluid 24 exits the tubing 30 through an outlet feature 62 as indicated by arrow 64 and some of the fluid 24 exits the tubing 30 through lateral opening 36 and into a tool structure 66, as indicated by arrow 68. Whether fluid is flowing through the lateral opening 36 and the extent of the flow can be measured by monitoring the strain data on optical fiber 44 of optical fiber cable 46, as discussed above with respect to the previous embodiments.

Figure 3:
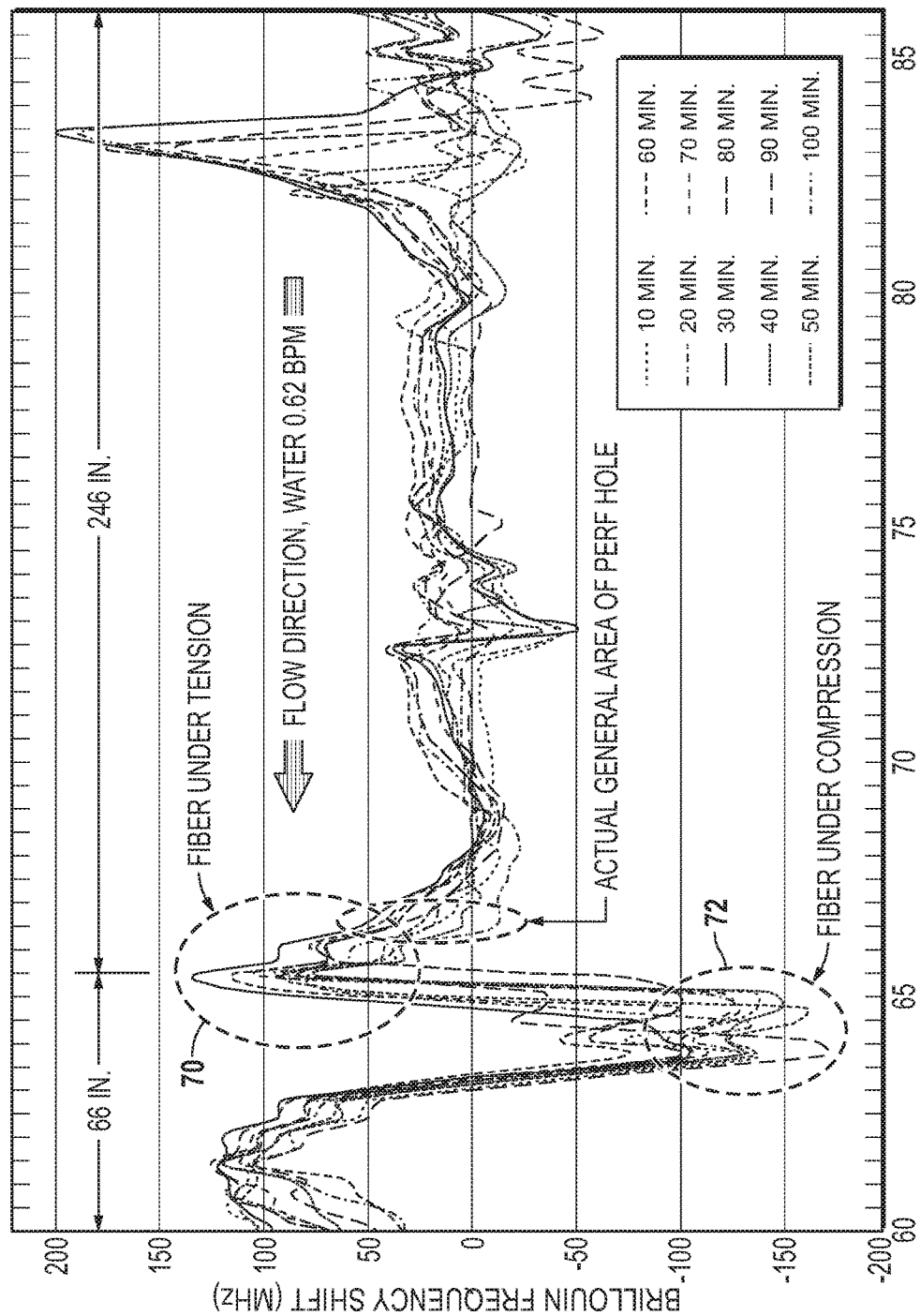
FIG. 3 is a graphical illustration showing a Brillouin frequency shift resulting from strain on the distributed sensor, according to an embodiment of the disclosure.

In this example, the laser interrogation system 48 may similarly be used to fire a laser pulse into the optical fiber 44 from one end and to monitor the Brillouin backscatter from the optical fiber 44. The frequency of this backscatter from each section of the optical fiber 44 depends on, for example, strain experienced by that section of the optical fiber 44. The laser interrogation system 48, in cooperation with data processor 50, analyzes the strain experienced by the optical fiber 44 at the location of lateral opening 36. In this example, the frequency shift measured by laser interrogation system 48 is proportional to the strain experienced by the optical fiber 44/optical fiber cable 46. As illustrated graphically in FIG. 3, the movement of fluid 24 through the lateral opening 36 creates a Brillouin frequency shift due to strains in the optical fiber cable 46 proximate the lateral opening 36. The strains on cable 46 result from fluid exiting or entering through lateral opening 36.

A positive frequency shift 70 in the strain data indicates tension in optical fiber 44/optical fiber cable 46 while the subsequent negative frequency shift 72 indicates compression in optical fiber 44/optical fiber cable 46. This allows the strain measurements to be used in identifying the location of, for example, perforations 54 or valves 56, through which inflows or outflows of fluid 24 occur. By calibrating this effect, the proportion of fluid 24 flowing in and/or flowing out through a given lateral opening 36 may be determined. For example, the flow through each perforation 54 and/or valve 56 may be determined based on the strain data.

In some embodiments, the spatial resolution of the distributed strain measurement along optical fiber cable 46 may be in a certain range, e.g. approximately 2-3 meters. However, the spatial resolution can vary substantially depending on the environment and equipment employed. An improved spatial resolution may be obtained so as to monitor more closely spaced lateral openings 36 by, for example, using an anchoring technique as described in greater detail below. Such techniques may be employed to improve the resolution of the Brillouin distributed strain measurements and/or for measuring strain with higher spatial resolution. These techniques are thus useful in refining the measurements and for obtaining more specific data or information on downhole conditions. In some applications, however, a lower resolution may be acceptable for identifying, for example, clusters of lateral openings 36 rather than individual lateral openings 36 experiencing inflows or outflows of fluid 24.

By way of example, the effects of tension and compression on optical fiber cable 46 and optical fiber 44 may be enhanced by placing anchors 74 on opposite sides of a given lateral opening or openings 36, as illustrated in FIG. 4. The anchors 74 may be used to establish anchor points on opposite sides of, for example, a valve 56, a perforation 54, and/or a cluster of perforations 54. The anchors 74 effectively establish a specific region of the optical fiber 44 and optical fiber cable 46 for measuring the effects of fluid flow with respect to a given lateral opening openings 36 (or for measuring other effects of fluid flow). By using anchor points 74 an improved spatial resolution is provided. In some applications, the anchors 74 also may be used for centralization of the optical fiber cable 46 or to otherwise help locate the optical fiber cable 46 within tubing 30 and/or wellbore 28.

The well system 20 may be used in a variety of applications and environments. Depending on the application and environment, the well system 20 may comprise many types of tubing strings deployed in vertical and/or deviated e.g. horizontal, wells. The well system 20 may comprise a variety of casings, well completions, production components, injection components, and/or other components deployed along the tubing string. Additionally, the tubing may comprise a variety of lateral openings, including perforations and openings through which fluid inflow or outflow is controlled by a flow control device. The flow control device may comprise a variety of devices including valves, such as ball valves, sliding sleeves, or other valves.

Furthermore, the configuration of components and the type of components used in the strain measurement system may be selected according to the flow conditions to be monitored. The strain measurement system may comprise various types of distributed sensors and interrogation systems. With laser type interrogation systems, the distributed sensor may comprise various types and numbers of optical fibers deployed in, for example, various types of optical fiber cables suitable for a given downhole application. Additionally, the interrogation system may comprise or be used in combination with various processor-based systems for processing strain data obtained from the distributed sensor system. The processor-based system may be a computer system or other processing system able to obtain sensor data on strain and to process that strain data into appropriate information related to fluid flow conditions, as described herein.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method for monitoring flow, comprising:
    deploying a tubing string in a wellbore;
    routing an optical fiber along an interior of the tubing string; anchoring the optical fiber at a plurality of anchor locations along the tubing, wherein a first anchor location is upstream of a lateral opening through the tubing string and a second anchor location is downstream of the lateral opening;
    flowing a fluid along the interior of the tubing string;
    using a laser interrogation system, coupled with the optical fiber, to obtain strain data from along the optical fiber;
    determining a change in a flow condition of the fluid based on the strain data,
    wherein determining comprises analyzing the strain data measured by the laser interrogation system to detect a strain signature caused by a radial flow of fluid through the lateral opening, the radial flow establishing tension and subsequent compression in the optical fiber, wherein the strain signature comprises a positive Brillouin frequency shift proximate a location of the lateral opening immediately followed by a negative Brillouin frequency shift; and
    identifying occurrence and the location of the radial flow of fluid based on the detected strain signature.

2. The method as recited in claim 1, wherein deploying the tubing string comprises deploying a production tubing string.

3. The method as recited in claim 1, wherein deploying the tubing string comprises deploying an injection tubing string.

4. The method as recited in claim 1, wherein routing comprises routing the optical fiber in an optical fiber cable deployed along the interior of the tubing string.

5. The method as recited in claim 1, further comprising monitoring a flow rate at a given location or locations along the interior of the tubing string.

6. The method as recited in claim 1, wherein determining comprises determining an inflow of fluid through a lateral opening along the tubing string.

7. A system, comprising:
    a tubing deployed along a wellbore, the tubing having a lateral opening;
    an optical fiber cable deployed along an interior of the tubing past the lateral opening; a plurality of anchors disposed along the optical fiber cable to anchor the optical fiber cable to the tubing, wherein the plurality of anchors comprises a anchor upstream of the lateral opening and an anchor downstream of the lateral opening; and
    a laser interrogation system coupled to the optical fiber cable, the laser interrogation system measuring strain in the cable, the laser interrogation system evaluating the strain to determine a change in fluid flow along the interior due to the lateral opening, wherein the laser interrogation system evaluates the strain measured by the laser interrogation system to detect a strain signature caused by a radial flow of fluid through the lateral opening, the radial flow establishing tension and subsequent compression in the optical fiber wherein the strain signature comprises a positive Brillouin frequency shift proximate a location of the lateral opening immediately followed by a negative Brillouin frequency shift, and wherein the laser interrogation system identifies occurrence and the location of the radial flow of fluid based on the detected strain signature.

8. The system as recited in claim 7, wherein the lateral opening comprises a plurality of perforations through the tubing.

9. The system as recited in claim 7, further comprising a valve disposed along the tubing to control flow through the lateral opening.

10. A method, comprising:
routing a distributed sensor along an interior of a tubing over a length of the tubing having a lateral opening;
anchoring the distributed sensor within the interior of the tubing at a first anchor location upstream of the lateral opening and a second anchor location downstream of the lateral opening;
flowing a fluid along the distributed sensor within the interior of the tubing;
measuring strain in the distributed sensor as a result of the fluid flowing along the distributed sensor using a laser interrogation system;
evaluating the strain to determine a change in a flow condition related to the lateral opening,
wherein evaluating comprises analyzing the strain measured by the laser interrogation system to detect a strain signature caused by a radial flow of fluid through the lateral opening, the radial flow establishing tension and subsequent compression in the distributed sensor, wherein the strain signature comprises a positive Brillouin frequency shift proximate a location of the lateral opening immediately followed by a subsequent negative Brillouin frequency shift; and
identifying occurrence and the location of the radial flow of fluid based on the detected strain signature.

11. The method as recited in claim 10, wherein routing the distributed sensor comprises routing an optical fiber.

12. The method as recited in claim 11, further comprising coupling the optical fiber to the laser interrogation system.

13. The method as recited in claim 12, wherein evaluating comprises determining a flow rate of the fluid in the tubing.

* * * * *